United States Patent [19]

Wendt

[11] 4,209,923
[45] Jul. 1, 1980

[54] SLIDE HOLDER TRAY

[76] Inventor: David W. Wendt, 5202 Schofield, Madison, Wis. 531716

[21] Appl. No.: 929,354

[22] Filed: Jul. 31, 1978

[51] Int. Cl.² .............................................. G09F 1/10
[52] U.S. Cl. .................................. 40/158 B; 40/154; 40/405
[58] Field of Search ............... 40/158 B, 158 R, 159, 40/154, 152, 367, 373, 405, 10 D, 10 R, 124.1

[56] References Cited
FOREIGN PATENT DOCUMENTS

| 86478 | 1/1966 | France | 40/152 |
| 420052 | 3/1967 | Switzerland | 40/158 B |
| 1435366 | 5/1976 | United Kingdom | 40/158 B |

Primary Examiner—John F. Pitrelli
Assistant Examiner—G. Lee Skillington
Attorney, Agent, or Firm—Isaksen, Lathrop, Esch, Hart & Clark

[57] ABSTRACT

A slide holder tray is disclosed which includes therein a plurality of slide holder cells, each of which is adapted to selectively receive a single flat article such as a photographic slide therein. Each of the slide holder cells is provided with an integrally formed flexible retaining spring which is resiliently bowed into one of two positions, only one of which overlies the top edge of the article to retain the article in the slide holder cell. Each slide holder cell also includes a tilting mechanism so that the article may be tilted out of the slide holder cell for easy insertion and removal. The slide holder tray also has rails extending outward from the periphery thereof to facilitate the stacking of a plurality of slide holder trays in a rack, cabinet, or similar enclosure.

20 Claims, 13 Drawing Figures

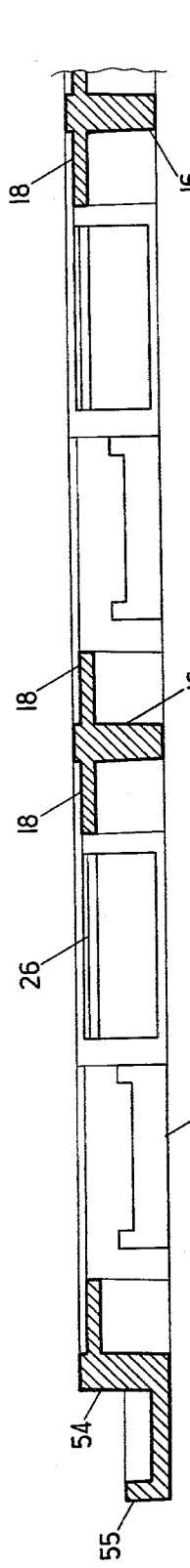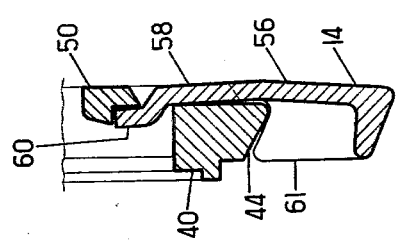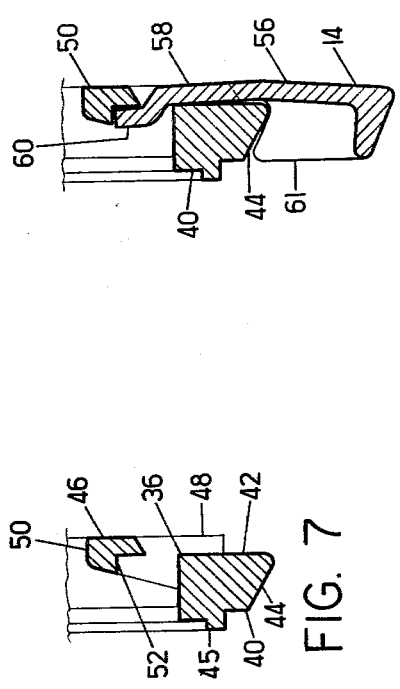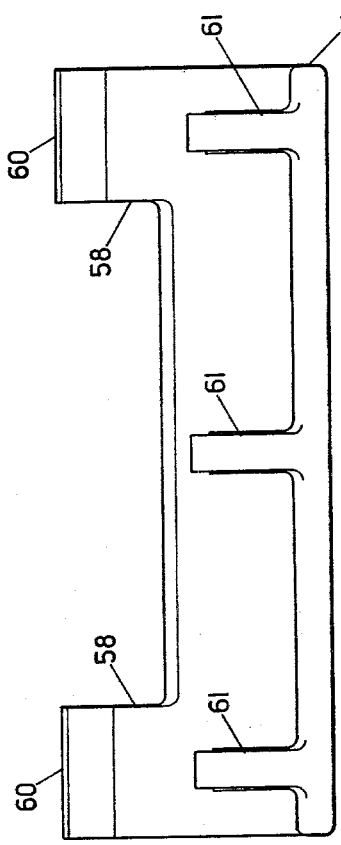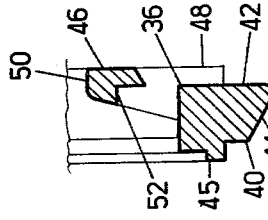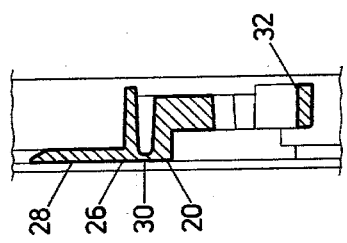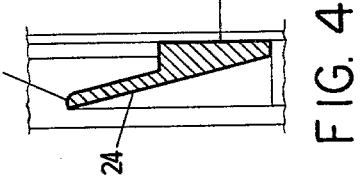

4,209,923

SLIDE HOLDER TRAY

BACKGROUND OF THE INVENTION

1. Field of the Invention

The invention relates to mounting devices for flat articles such as photographic slides or transparencies, and, in particular, to trays for holding large numbers of such articles for storage and viewing.

2. Description of the Prior Art

The prior art is generally cognizant of trays or frames for holding a plurality of photographic slides therein. Examples of such devices are described in U.S. Pat. Nos. 2,821,037, 3,217,436, 3,419,984, 3,543,426, and 3,958,348. In addition, the prior art includes several examples of such frames in which the slides are retained in place by retaining members engaging opposite edges of the slide, as exemplified by U.S. Pat. Nos. 3,277,598 and 3,727,334. At least one example has been disclosed, that in U.S. Pat. No. 3,195,258, of a mounting frame for slides which includes a resilient member to engage the edge of the slides. It has been a problem with such devices that the slides are relatively difficult to insert and remove from the frame, particularly when only one side of the frame is accessible, as when the frame is placed on a light table or other planar platform.

SUMMARY OF THE INVENTION

The present invention is summarized in that in a slide holder tray having a plurality of slide holder cells, each of which is adapted to receive therein an article having four edges such as a photographic slide, a slide holder cell includes a pair of faced parallel ribs defining two opposite sides of the slide holder cell, a support shelf extending inwardly into the slide holder cell from each of the ribs and adapted to support opposite edges of the article, a cross-member extending between the ribs to define the bottom of the slide holder cell, a raised retainer extending upward from the cross-member to retain the bottom edge of the article, and a flexible retaining spring formed extending between the ribs at the top of the slide holder cell, the retaining spring being manually operable between two positions, only one of which overlies the top edge of the article.

It is an object of the present invention to provide a slide holder tray formed of a plurality of slide holder cells in which the articles in any selectable one of the slide holder cells may be easily inserted and removed with access to only the top side of the slide holder tray.

It is another object of the present invention to provide a slide holder tray in which the articles received therein are firmly and securely held within the individual slide holder cells.

It is yet another object of the present invention to provide such a slide holder tray that can be integrally molded as a single unitary piece of thermoplastic material.

Other objects, advantages, and features of the present invention will become apparent from the following specification when taken in conjunction with the accompanying drawings.

BRIEF DESCRIPTION OF THE DRAWINGS

FIG. 3 is a cross-sectional view taken along the line 3 in FIG. 1.

FIG. 4 is a cross-sectional view taken along the line 4 in FIG. 1.

FIG. 5 is a cross-sectional view taken along the line 5 in FIG. 1.

FIG. 6 is a cross-sectional view taken along the line 6 of FIG. 1.

FIG. 7 is a cross-sectional view taken along the line 7 of FIG. 1.

FIG. 8 is a back plan view of the indexing tab for use with the slide holder tray of FIG. 1.

FIG. 9 is a side plan view of the indexing tab of FIG. 8 attached to the slide holder tray.

DESCRIPTION OF THE PREFERRED EMBODIMENT

Figure 1:
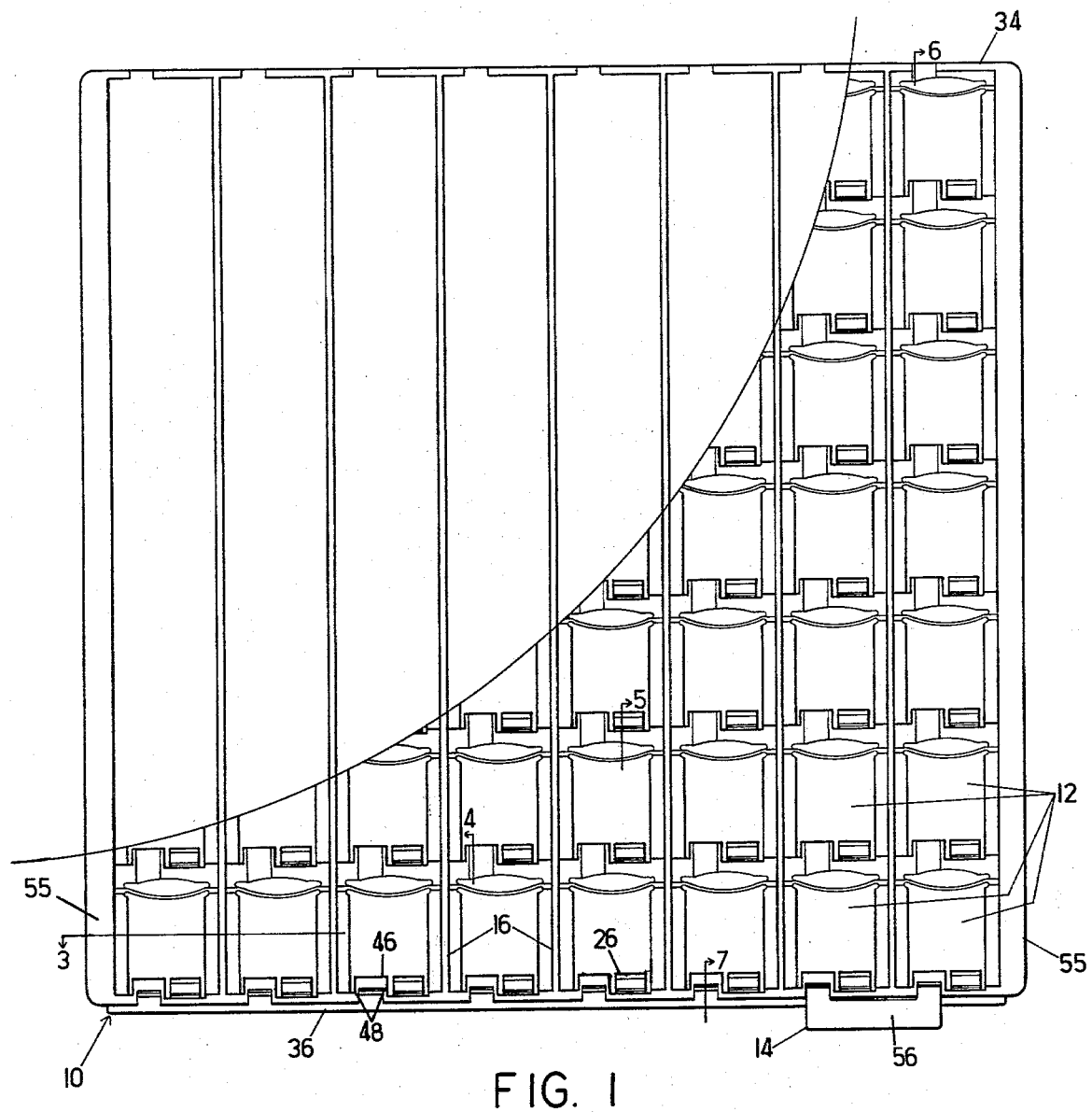
FIG. 1 is a front plan view of a slide holder tray constructed according to the present invention.

Shown in FIG. 1 is a photographic slide holder tray, generally indicated by the reference numeral 10. The slide holder tray 10 is a thin, flat, generally rectangular member molded from a thermoplastic resin in a single unitary piece. The slide holder tray 10 includes therein a plurality of individual slide holder cells 12 each designed to removably receive therein a photographic slide or transparency. An indexing and labeling tab 14 is removably attached to the lower edge of the slide holder tray 10.

Figure 2:
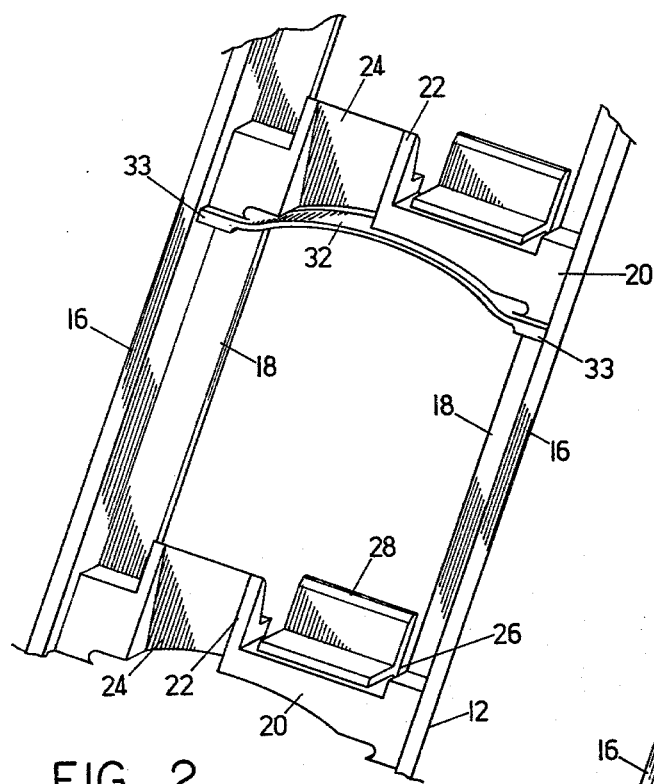
FIG. 2 is an enlarged perspective view of a single slide holder cell of the slide holder tray of FIG. 1.

A single individual slide holder cell 12 is illustrated in greater detail in FIG. 2. The slide holder cell 12 has its longitudinal side edges defined by respective portions of a pair of longitudinally extending stiffening ribs 16. As can be seen in FIG. 1, the ribs 16 extend the full longitudinal length of the slide holder tray 10 to divide the slide holder tray 10 into vertical rows of slide holder cells 12. Within each of the slide holder cells 12, as seen in FIG. 2, a support shelf 18 extends laterally from each of the ribs 16 on the sides of the cell inwardly toward the center of the cell 12. As may be seen in FIG. 2 and in the cross-sectional view of FIG. 3, each of the support shelves 18 is positioned toward the rearward edge of the respective rib 16 and thus toward the rear of the slide holder cell 12.

Within each of the vertical rows of the slide holder cells 12, the individual slide holder cells 12 are divided from each other by cross-members 20 which extend between the opposing ribs 16, the cross-members 20 forming the bottom of each of the slide holder cells 12. Each of the cross-members 20 has formed integrally within it, and offset to one side therein, a raised retainer 22. As can be seen in the cross-sectional view of FIG. 4, the raised retainer 22 has its rear surface formed at an oblique angle relative to the plane of the slide holder tray 10. The front surface of the raised retainer 22 has formed in it a recessed canted surface 24 which is also slanted obliquely relative to the plane of the slide holder tray 10 and which is recessed from the front surface of the remainder of the cross-member 20. The recessed canted surface 24 also extends downward into the front of the cross-member 20. The cross-member 20 also includes formed on it a slide tilting mechanism 26. As can be seen in FIG. 5, the tilting mechanism 26 includes a tiltable slide seat 28 of a generally L-shaped cross section and of a width extending most of the distance between the raised retainer 22 and the opposite rib 16. At the bottom rear surface of the slide seat 28 adjacent the juncture of the L, as can be seen in FIG. 5, the slide seat 28 is joined to the remainder of the cross-member 20 by a flexible integral spring 30. The integral spring 30 is formed as an integrally formed tapered portion of thermoplastic material forming a web connecting a base of the slide seat 28 with the rearmost edge of the top surface of the cross-member 20 as can be seen in FIG. 5. The cross-member 20 has its lower surface formed in an arcuate concave configuration, as shown in FIG. 2, formed to be concave facing in a downward direction toward the cell 12 beneath it.

Figure 11:
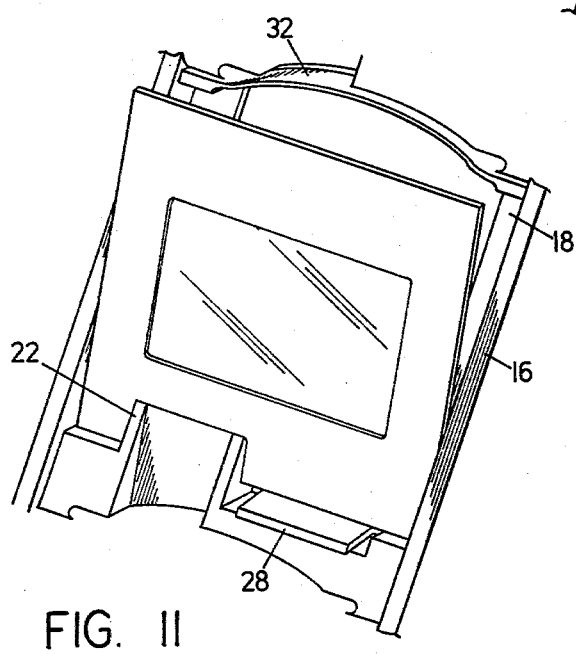
FIG. 11 is an enlarged view similar to FIG. 10 in which the slide has been tilted out of the slide holder cell.

Also formed in each of the slide holder cells 12 extending between the opposed ribs 16 at the topmost portion of the slide holder cell 12 is a flexible retainer spring 32. The flexible retainer spring 32 is formed as a relatively thin strand of the thermoplastic material integrally formed extending between the ribs 16 with its length slightly greater than the distance between the ribs 16 so that the flexible retainer spring 32 is resiliently bowed into one of two arcuately curved positions. The width and thickness of the retainer spring 32 is selected so that the retainer spring 32 is sufficiently flexible to be resiliently urged to one of two positions, either an upwardly oriented position as shown in FIG. 11, or a downwardly oriented position. At each end of the retainer spring 32 thickened corner portions 33 are formed adjacent the respective ribs 16 to define the upper corners of the slide holder cell 12.

If desired, the thickness of the retainer spring 32 need not be constant. It is envisioned that it may be desirable to form the retainer spring 32 to be thicker in its central portion and tapered in thickness as it approaches each corner portion 33. It would also be possible, and in some cases desirable, to form an even more narrowed neck portion on each retainer spring 32 adjacent each corner portion 33 to serve as the primary hinge for the bending of the retainer spring 32.

As stated, the slide holder tray 10 includes a plurality of the slide holder cells 12 with the exact number of slide holder cells 12 in the slide holder tray 10 being variable according to the needs of the particular user. The preferred embodiment, as shown in FIG. 1, includes 8 rows of 7 slide holder cells 12 each for a total of 56 slide holder cells. While the cross-members 20 between each of the vertically adjacent slide holder cells 12 in the interior of the tray 10 are identical and similar to the ones shown in FIG. 2, special upper and lower tray edges 34 and 36 are formed at the top and bottom edges of the slide holder tray 10.

The upper tray edge 34 has formed in its lower edge aligned with the top of each of the slide holder cells 12 in the top row a lower arcuate concave surface similar to those formed along the bottom of each of the cross-members 20. Also formed in the upper tray edge 34 at each of the top row of cells 12, as shown in FIG. 6, is a recessed canted surface 35 which tilts inward and downward into the interior of the adjacent slide holder cell 12, similar to the canted surfaces 24 in the cross-members 20. As can be seen in FIG. 6, the upper tray edge 34 also includes an outwardly extending upper edge rail 38 extending continuously along the top of the upper tray edge 34.

The lower tray edge 36 has formed on it an outwardly extending lower edge rail 40 which is formed of a vertical front surface 42 which curves into an upwardly slanted rear surface 44 and which terminates on the rear surface of the tray 10 at an abutment rib 45. The lower tray edge 36 has a respective tilting mechanism 26 formed extending upwardly from it into each of the lower row of the slide holder cells 12, each being similar to the tilting mechanisms 26 on the cross-members 20. Also formed on the lower tray edge 36 in each of the lowest row of slide holder cells 12 is a special lower edge raised retainer 46. The lower edge raised retainer 46 includes two upstanding side bars 48, each having its rear surface slanted forwardly, and a cross-bar 50 extending between the tops of the side bars 48, the cross-bar 50 having a notch 52 formed on its rear underside surface as can be seen in FIG. 7.

At each side edge of the slide holder tray 10, side ribs 54 form the extreme outboard edges of the slide holder cells 12 in the two side columns of the tray 10, with side rails 55 extending laterally outward from side ribs 54 as shown in FIG. 3.

The indexing tab 14 as shown in FIGS. 1, 8 and 9, includes a labeling surface 56 from the ends of which a pair of legs 58 extend upward and backward with the legs 58 terminating at their upper ends in a pair of tabs 60 offset rearwardly from the plane of the legs 58. At the base of the labeling surface 56, a rearwardly extending support surface is formed from which three raised locking members 61 extend upwardly. The three locking members 61 have their top surfaces slanted downward toward the labeling surface 56 and are joined to it be a concavely curved web corresponding in shape to the curvature at the junction of the slanted rear surface 44 and the vertical front surface 42 of the lower edge rail 40.

In its operation the slide holder tray 10 functions as a display, carrying and storage rack for up to 56 photographic slides or other flat articles. The slides are individually carried in the slide holder cells 12 and individual slides may be seperately removed and replaced as desired. All the slides in the tray 10 are available for immediate viewing merely by backlighting the tray 10, as by putting the tray 10 on a light table or holding it in front of a diffused light source.

Figure 10:
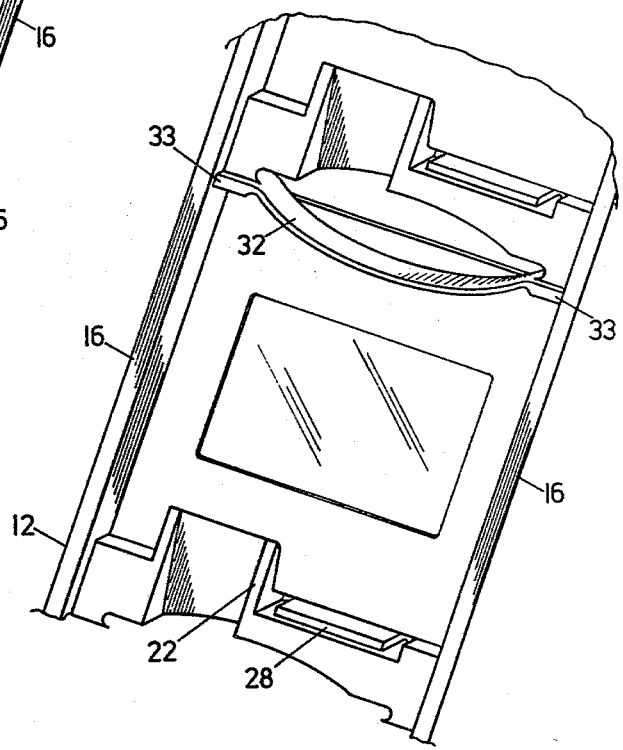
FIG. 10 is an enlarged view of the slide holder cell of FIG. 2 with a photographic slide received in the slide holder cell.

It is an advantageous feature of the slide holder tray 10 that an individual slide in any of the slide holder cells 12 may be inserted or removed without disturbing any of the other slides. As shown in FIG. 10, when a slide having four edges is received in the slide holder 12, the rear surface of two opposite edges, in particular the side edges, of the slide rest on the support shelves 18 extending from the ribs 16. The front of the bottom edge of the slide is retained in place by the raised retainer 22, while the edge of the slide opposite the raised retainer 22, i.e., the top edge, is retained in place by the retaining spring 32. Note that since the support shelves 18 only extend under the opaque, or mounting part of the slide, nothing in the slide holder cell 12 in any way interferes with the viewing of the transparent area of the slide.

To free a slide from the slide holder cell 12, the flexible retaining spring 32 is manually pushed to its other stable position, which is free of the slide, as shown in FIG. 11. This is accomplished by pushing upward on the retainer spring 32 until it is over-center, after which the spring 32 resiliently is bowed into its upwardly oriented stable position freeing the top edge of the slide. It has been found that the retainer spring 32 operates best slightly to either side of its center, so the recessed canted surface 24 is designed to encourage insertion of a finger in that area, slightly left of the center of the retaining spring 32, to operate the retainer spring 32 in the downward direction.

To remove the slide from the slide holder cell 12, the tilting mechanism 26 is operated. After the retainer spring 32 is flipped out of the way of the top edge of the slide, the front edge of the slide seat 28 is pressed downward, pivoting the slide seat 28 forwardly with the pivot point being at the integral spring 30. This motion tilts the top edge of the slide forward as shown in FIG. 11 so that the slide may easily be lifted out of the slide holder cell. It is to facilitate this tilting of the slide that the rear surface of the raised retainer 22 has a tilted surface. To reinsert the slide, the bottom edge of the slide is placed behind the raised retainer 22 and on the slide seat 28 and the slide is released to fall to rest on the support shelves 18. The retaining spring 32 can then be returned to its lower stable position and the slide is secured in position in the slide holder cell.

The side rails 55 are included on the slide holder tray 10 so that a plurality of the slide holder trays 10 can be stacked in a rack, cabinet, or similar structure. Similarly the lower tray edge 36 and the upper tray edge 34 may be used for the same purpose. The longitudinal raised ribs 16 provide stiffening support to the tray 10 as well as serving to separate the slides in each of two of the slide holder trays 10 if they are stacked on one another.

The indexing tab 14 serves as a labeling and indexing device for such stacked trays 10. The tabs 60 of the legs 58 of the tab 14 are inserted up and into respective ones of the notches 52 behind adjacent ones of the cross-members 50 and then the locking members 61 are snapped over the bottom of the lower tray edge 36. The labeling surface 56 then extends beyond the bottom edge of the tray 10 so that a suitable label can be attached thereto. The indexing tabs 14 in a stack of the trays 10 can also be offset laterally since, as it is apparent in FIG. 1, there are eight of the special raised retainers 46 and thus seven positions into which the indexing tab 14, bridging between two of the raised retainers, may be inserted. The indexing tabs 14 may also be supplied in various colors to aid in the distinguishing of the various slide holder trays 10 or may have labeling indicia molded onto their labeling surfaces 56.

Because each of the slide holder cells 12 includes a pair of living hinges, in the integral spring 30 and in the retaining spring 32, and because the entire slide holder tray 10 is manufactured in one unitary piece, the material from which the slide holder tray 10 is formed can be important. It has been found that polypropylene materials offer an advantageous combination of flexibility, strength and resilience and will withstand a long period of use. Other thermoplastic materials are also suitable, with the respective widths of the integral spring 30 and the retaining spring 32 being increased or decreased depending on the decreased or increased rigidity of the material as compared to polypropylene.

The slide holder tray 10 offers several important advantages over previously known trays. Since all the slides are held in the slide holder cells 12 by two opposed edges, the slides are securely held therein and the slide holder tray 10 may be carried or held in any position without any of the slides dropping out. Furthermore, all of the slides in the tray 10 are always available for immediate viewing, merely by backlighting the entire tray 10, as by placing the tray 10 on a light table. With the tray 10 on such a table, any individual slide can easily be individually removed from the tray 10 without disturbing any of the other slides and without the need for any access to the rear side of the tray 10. And all these advantages are achieved in a one-piece tray that is light yet durable and includes no separate springs or retainers that could break or fall off.

It is also envisioned that the slide holder tray 10 of FIGS. 1-11 may be used for a variety of flat articles other than photographic slides. For example, the tray 10 could be used to store a plurality of coins, which are often mounted by collectors in flat mountings similar in size and shape to photographic slides. It is envisioned that the slide holder tray 10 of the present invention is equally applicable to flat articles of a wide variety of types and sizes, though, of course, the size and dimensions of the holder cells 12 may have to be varied for different sized articles.

Figure 12:
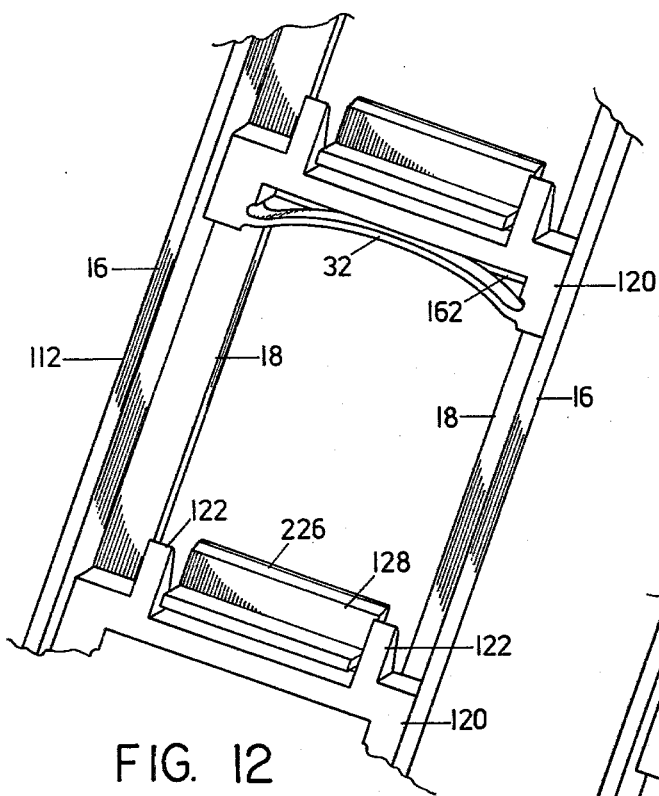
FIG. 12 is an enlarged perspective view of an alternative embodiment of the slide holder cell of FIG. 2.
Figure 13:
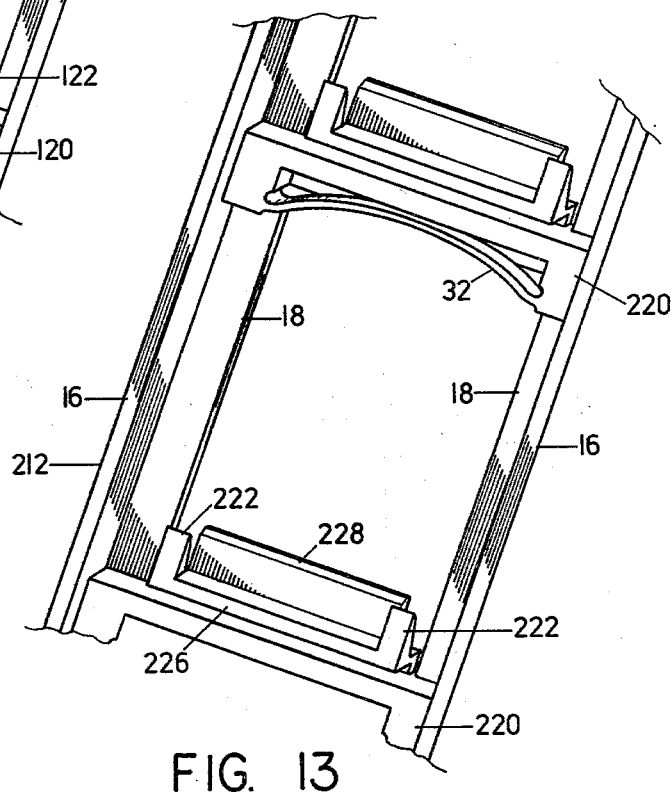
FIG. 13 is an enlarged perspective view of another alternative embodiment of the slide holder cell of FIG. 2.

An alternative embodiment of a slide holder cell 112, suitable for use in the slide holder tray 10, is shown in FIG. 12. In the slide holder cell 112 of FIG. 12, elements which are identical to their corresponding elements in the slide holder cell 12 of FIGS. 1-11 are given identical reference numerals, while elements that are similar to their corresponding elements in the slide holder cell 12 are given corresponding reference numerals, increased by 100. In the slide holder cell 112, the tilting mechanism 126 has been altered so that the slide seat 128 is centrally positioned on the cross-member 120, and the slide seat 128 has been made significantly wider. Instead of one raised retainer 22, as in the slide holder cell 12, a pair of raised retainers 122 are provided on opposite sides of the slide seat 128 in the slide holder cell 112. Each of the raised retainers 122 has an obliquely angled rear surface, but the front surface of the raised retainers 122 includes no recessed canted surface, such as the surface 24 of the slide holder cell 12. The cross-member 120 of the slide holder cell 112 of FIG. 12 is formed with a squared lower edge with an additional transverse shelf 162 being provided for increased lateral stiffness.

The slide holder cell 112 may be substituted for the slide holder cell 12 when it is not necessary to provide a recessed canted surface such as that at 24 in the slide holder cell 12. The canted surface 24 is provided to influence the user to actuate the retainer spring 32 off-center, i.e., slightly to the left of center, so that the retainer spring 32 operates easier. If the material of the slide holder tray 10 is such that the retainer spring 32 will operate easily, or if the thickness of the retainer spring 32 is varied so that hinge portions are provided in it to make it easier to operate, then the need for the recessed surface 24 is obviated. In the slide holder cell 112, two raised retainers 122 are provided to prevent undesired tilting of the slide in the cell.

Another alternative embodiment of a slide holder cell 212, suitable for use in the slide holder tray 10, is shown in FIG. 12. Again identical parts have been given identical reference numerals and similar parts have been given corresponding reference numerals. In the slide holder cell 212, the slide seat 228 of the tilting mechanism 226 is again widened and located centrally on the cross-member 220. However, in the slide holder cell 212 the two raised retainers 222 are formed on the slide seat 228 itself. The raised retainers 222 still have obliquely slanted rear surfaces and have front surfaces formed along the front of the slide seat 228.

The slide holder cell 212 functions similarly to the slide holder cells 12 and 112, with the tilting mechanism 226 functioning to tilt the slide out of the slide holder cell 212. By providing the raised retainers 222 on the slide seat 228 it may be possible to tilt the slide at an even greater angle, depending on the material from which the tray 10 is formed and depending on the length of the integral spring at the base of the slide seat.

It is understood that the subject invention is not limited to the particular construction and arrangement of parts disclosed and illustrated herein, but embraces all modified forms thereof as come within the scope of the following claims.

I claim:

1. In a slide holder tray including a plurality of slide holder cells each of which is adapted to receive therein a flat article having four edges such as a photographic slide, a slide holder cell comprising:
   a. a pair of spaced parallel ribs defining two opposite sides of the slide holder cell;
   b. a support shelf extending inwardly into the slide holder cell from each of the ribs and adapted to support opposite edges of the article;
   c. a cross-member extending between the ribs to define the bottom of the slide holder cell;
   d. a raised retainer extending upward from the cross-member to retain the bottom edge of the article; and
   e. a flexible retaining spring formed extending between the ribs at the top of the slide holder cell, the retaining spring being manually operable between two stable positions, only one of which overlies the top edge of the article so that the article may be freely removed from the slide holder cell when the retaining spring is in its stable position not overlying the top edge of the article.

2. In a slide holder tray, the slide holder cell as claimed in claim 1 wherein another cross-member is located extending between the ribs at the top of the slide holder cell above the retaining spring, said another cross-member having a curved lower surface to receive the retaining spring and having a recessed canted surface formed in it located to one side of the center of the retaining spring.

3. In a slide holder tray, the slide holder cell as claimed in claim 1 wherein the raised retainer is formed with its rear surface formed at an oblique angle relative to the plane of the slide holder tray so that the article may be tilted out of the slide holder cell.

4. In a slide holder tray, the slide holder cell as claimed in claim 1 wherein thickened corner portions are formed at each end of the retaining spring adjacent the ribs to retain the upper corners of the article in place in the slide holder cell.

5. In a slide holder tray, the slide holder cell as claimed in claim 1 wherein there are two raised retainers, located spaced apart on the cross-member.

6. In a slide holder tray including a plurality of slide holder cells each of which is adapted to receive therein a flat article having four edges such as a photographic slide, a slide holder cell comprising:
   a. a pair of spaced parallel ribs defining two opposite sides of the slide holder cell;
   b. a support shelf extending inwardly into the slide holder cell from each of the ribs and adapted to support opposite edges of the article;
   c. a cross-member extending between the ribs to define the bottom of the slide holder cell;
   d. a raised retainer extending upward from the cross-member to retain the bottom edge of the article; and
   e. a flexible retaining spring formed extending between the ribs at the top of the slide holder cell, the retaining spring being manually operable between two positions, only one of which overlies the top edge of the article, the retaining spring being formed to be longer than the distance between the two ribs so that the retaining spring is resiliently bowed in one of two vertical directions, with the retaining spring overlying the top edge of the article when bowed in a downward direction.

7. In a slide holder tray, the slide holder cell as claimed in claim 6 wherein the slide holder trays are molded as one unitary piece formed of a thermoplastic material and wherein the retaining spring is formed as a web of such material integrally formed extending between the adjacent ribs.

8. In a slide holder tray, the slide holder cell as claimed in claim 7 wherein the thermoplastic material is polypropylene.

9. In a slide holder tray including a plurality of slide holder cells therein each adapted to receive a flat article having four edges such as a photographic slide, the slide holder cell comprising:
   a. a pair of parallel ribs disposed on two opposite sides of the slide holder cell;
   b. a support shelf extending inwardly from each of the ribs and adapted to support two opposite edges of the article;
   c. a cross-member extending across the bottom of the slide holder cell between the ribs;
   d. a raised retainer extending upward from the cross-member to retain the bottom edge of the article;
   e. movable retaining means to selectively retain the top edge of the article; and
   f. a tilting mechanism formed on the cross-member and adapted to pivot to tilt the top of the article out of the slide holder cell.

10. In a slide holder tray, a slide holder cell as claimed in claim 9 wherein the tilting mechanism includes a tiltable slide seat attached to the cross-member by a flexible integral spring integrally formed as a thin web of material connecting the slide seat with the cross-member.

11. In a slide holder tray, a slide cell as claimed in claim 9 wherein the movable retaining means is a flexible retaining spring integrally formed extending between the ribs and formed to be of a length longer than the distance between the ribs so that it is resiliently bowed in one of two vertical directions, the retaining spring retaining the top edge of the article when bowed in a downward direction.

12. In a slide holder tray, a slide holder cell as claimed in claim 9 wherein the slide seat has a generally L-shaped cross section.

13. In a slide holder tray, a slide holder cell as claimed in claim 12 wherein the raised retainer is formed on the slide seat.

14. In a slide holder tray, a slide holder cell as claimed in claim 9 wherein the slide holder tray is generally planar and wherein the raised retainer has a rear surface formed at an oblique angle relative to the plane of the slide holder tray to allow the tilting of the article out of the slide holder cell.

15. In a slide holder tray, a slide holder cell as claimed in claim 14 wherein there are two identical raised retainers located on opposite sides of the tilting mechanism.

16. A slide holder tray comprising:
   a. rectangular frame forming the edges of the tray;
   b. a plurality of longitudinal ribs extending between the ends of the tray to divide the tray into vertical rows;
   c. a plurality of cross-members extending between adjacent pairs of ribs to define a plurality of slide holder cells in each row, each slide holder cell adapted to receive a flat article therein;
   d. a pair of support shelves formed extending into each slide holder cell from the ribs on each side thereof;
   e. a raised retainer extending upward from each cross-member in each slide holder cell to retain the bottom edge of an article received therein; and
   f. a flexible retaining spring extending between the ribs at the top of each slide holder cell, and manually operable between two stable positions only one of which overlies the top edge of an article received in the slide holder cell so that the article may be freely removed from the slide holder cell when the retaining spring is in its stable position not overlying the top edge of the article.

17. A slide holder tray as claimed in claim 16 wherein the frame includes a rail extending outward therefrom around the periphery thereof, the rail adapted to allow the slide holder tray to be slidably received in a storage rack.

18. A slide holder tray as claimed in claim 16 wherein the frame includes a lower tray edge, wherein a raised retainer is formed extending upward from the lower tray edge into the slide holder cells adjacent thereto, and wherein the raised retainers on the lower tray edge each include a pair of upstanding side bars joined at their top by a crossbar.

19. A slide holder tray as claimed in claim 18 further including an indexing tab having a labeling surface thereon and having a pair of legs extending upward therefrom, the legs being insertable behind the crossbars of the raised retainers on the lower tray edge and the indexing tab engaging the lower tray edge to selectively attach the indexing tab to the slide holder tray.

20. A slide holder tray comprising:
   a. a rectangular frame forming the edges of the tray;
   b. a plurality of longitudinal ribs extending between the ends of the tray to divide the tray into vertical rows;
   c. a plurality of cross-members extending between adjacent pairs of ribs to define a plurality of slide holder cells in each row, each slide holder cell adapted to receive a flat article therein;
   d. a pair of support shelves formed extending into each slide holder cell from the ribs on each side thereof;
   e. a raised retainer extending upward from each cross-member in each slide holder cell to retain the bottom edge of an article received therein; and
   f. a flexible retaining spring extending between the ribs at the top of each slide holder cell, and manually operable between two stable positions only one of which overlies the top edge of an article received in the slide holder cell, each flexible retaining spring being formed as an integrally molded web of the slide holder tray extending between the ribs on each side of each of the slide holder cells.

* * * * *